Figure 1:
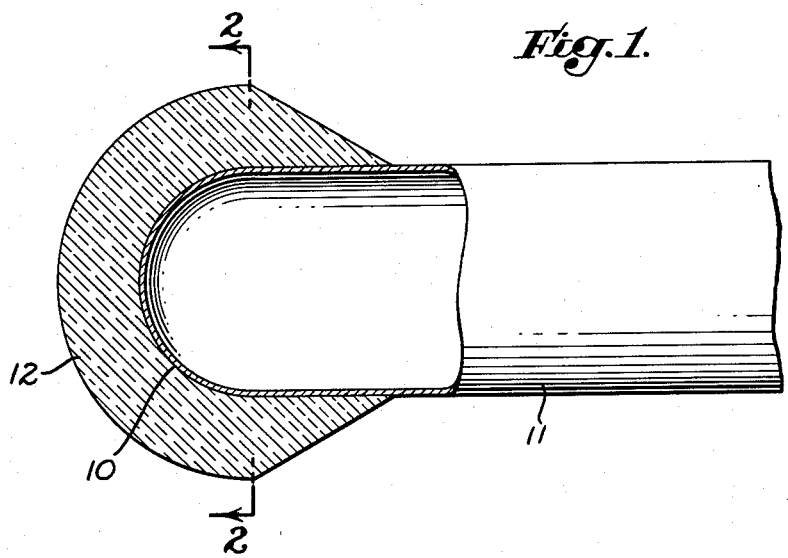

July 23, 1963

W. F. LIBBY 3,098,757

HEAT RESISTANT STRUCTURE

Filed May 26, 1961

INVENTOR.
WILLARD F. LIBBY

BY HIS ATTORNEYS.
HARRIS, KIECH, RUSSELL & KERN 3,098,757
HEAT RESISTANT STRUCTURE
Willard F. Libby, % Dept. of Chemistry, University of California, Los Angeles, Calif.
Filed May 26, 1961, Ser. No. 113,026
5 Claims. (Cl. 117—35)

This invention relates to heat resistant structures and, in particular, to structures for exposure to heat of high intensity and relatively short duration such as that produced by blasts and explosions and by friction at high speeds in relatively dense atmospheres.

Sudden bursts of heat of relatively high intensity result in heating which is sometimes referred to as flash heating. Flash heating may be produced by explosions of all types. Flash heating occurs in structures exposed to the exhaust of rockets at launching or firing. Flash heating generated by friction usually occurs at the surface of objects entering the atmosphere at high velocities. It is an object of the present invention to provide a structure that is highly resistant to flash heating. A further object is to provide such a structure which is rugged, easily handled and relatively inexpensive.

It has been found that flash heating produces incandescence at the surface of the object being heated and that a major portion of the energy present is in the visible range. The present invention contemplates providing a protective coating for a structure, with this coating having certain optical properties which will protect the underlying structure from the effects of the flash heating. It is an object of the invention to provide a heat resistant structure including a substrate having a mirror finish at the surface thereof and a layer of optically transparent material on said surface. In such a structure, the light generated at the outer surface thereof will be radiated in all directions, with a major portion being directed through the layer of transparent material toward the substrate. The light energy reaching the substrate will be reflected away from the underlying structure by the mirror surface. This reflected light energy will have passed through the transparent layer twice but very little energy will be dissipated in the layer since it is optically clear.

It is an object of the invention to provide such a heat resistant structure which may be made in various shapes and which may utilize various materials. A particular object is to provide a heat resistant structure in which the substrate may comprise the outer skin of the object being protected with the skin having a polished mirrorlike finish. Another object is to provide such a structure which may utilize various optically transparent materials such as quartz, glass, and plastic for the outer layer.

Other objects, advantages, features and results of the invention will more fully appear in the course of the following description. The drawing merely shows and the description merely describes preferred embodiments of the present invention which are given by way of illustration or example.

Figure 2:
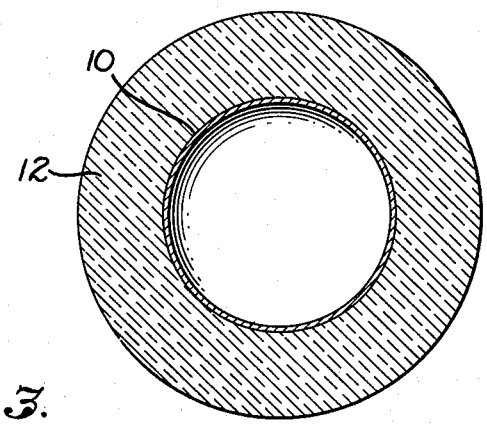
Figure 3:
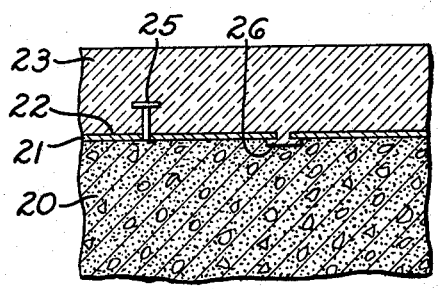

In the drawing:
FIG. 1 is a side view of a preferred embodiment of the invention;
FIG. 2 is a sectional view taken along the line 2—2 of of FIG. 1; and
FIG. 3 is a sectional view through an alternative form of the invention.

FIGS. 1 and 2 illustrate the application of the present invention to the forward end of a vehicle or projectile. Typically, the vehicle may comprise a forward body member in the form of a hemispherical shell 10 joined to an intermediate body member in the form of a cylindrical shell 11. The hemispherical shell 10 may be formed of stainless steel with the exterior surface polished to provide a mirrorlike finish. A layer of optically transparent material 12 is applied to the shell 10.

The layer 12 of optically clear material is made relatively thick and should be thick enough to physically isolate the exterior surface of the structure from the surface of the shell 10 for the duration of the exposure to the flash heating. The layer should be in the order of several inches in thickness and preferably is made in the range of about two to four inches thick for use on bodies entering the earth's atmosphere.

Typically, the layer 12 of optically transparent material can be cast polyethylene plastic three inches thick with the plastic reinforced by including glass fibers in a proportion of about one part fiber to twenty parts plastic by weight when the plastic is polymerized.

Other plastics, glass and quartz may be used for the optically clear layer. Glasses with very low temperature coefficients of expansion are preferred because of their superior resistance to sudden changes in temperature.

It should be kept in mind that the present invention is not restricted to any particular material for the shell 10 and the clear layer 12, although the preferred materials have been mentioned above. The shell or substrate must have an exterior surface which can be given a polished or mirrorlike finish so as to have maximum reflectance, preferably substantially one hundred percent. The material used in forming the layer 12 must be capable of being formed in a thick layer which is optically clear or transparent and preferably having substantially one hundred percent transmittance.

FIG. 3 illustrates the application of the invention to a fixed structure for protecting the structure against explosive blasts, rocket firings and the like. The structure may have a base 20 of any suitable material such as concrete, steel or wood. A metal skin 21 having a highly polished surface 22 is fixed to the base 20. A layer 23 of optically clear material is fixed to the skin 21 to complete the heat resistant structure. Any of the materials mentioned above may be used in the layer 23 which preferably is in the order of two to four inches in thickness.

The optically transparent material may be maintained in place by various means, such as by the adhesion of the coating or by the contour of the various elements. One or more anchoring members, such as the stud 25 of FIG. 3, may be carried on the skin 21 or shell 10, with the clear material being cast therearound. As another alternative, anchoring openings, such as the groove 26 of FIG. 3, may be utilized for this purpose.

Flash heating occurring at the exterior surface of the layer 12 or the layer 23 produces incandescence at the surface with radiation of light energy in all directions. The light directed towards the shell 10 or the skin 21 passes through the optically clear layer, is reflected at the polished surface and again passes through the clear layer as it travels away from the structure being protected. Thus a major portion of the heating energy is directed away from the structure. The material comprising the optically clear layer has a relatively low thermal conductivity which provides some additional heat insulation for the underlying structure. The well-known technique of heat dissipation by continuous vaporization of the surface layer of a structure may be incorporated with the present invention if desired. When operating under these circumstances, it is ordinarily desirable to make the optically clear layer thicker in order to provide sufficient material for vaporization.

Although exemplary embodiments of the invention have been disclosed and discussed, it will be understood that other applications of the invention are possible and that the embodiment disclosed may be subjected to various changes, modifications and substitutions without necessarily departing from the spirit of the invention.

I claim as my invention:

1. In a structure for resisting heat generated at the outer surface thereof, the combination of:
   a substrate with an outwardly directed surface having substantially one hundred percent optical reflectance for reflecting light away from the interior of the structure; and
   a layer of optically transparent material in the order of several inches thick on said surface.

2. In a heat resistant structure, the combination of:
   a metal substrate having an outwardly directed polished light-reflecting surface for reflecting light away from the interior of the structure; and
   a layer of clear quartz in the order of several inches thick on said surface.

3. In a heat resistant structure, the combination of:
   a metal substrate having an outwardly directed polished light-reflecting surface for reflecting light away from the interior of the structure; and
   a layer of clear glass in the order of several inches thick on said surface.

4. In a heat resistant structure, the combination of:
   a metal substrate having an outwardly directed polished light-reflecting surface for reflecting light away from the interior of the structure; and
   a cast layer of clear plastic in the order of several inches thick on said surface.

5. In a heat resistant structure, the combination of:
   a metal substrate having an outwardly directed polished light-reflecting surface for reflecting light away from the interior of the structure; and
   a layer of clear polyethylene reinforced with glass fibers and in the order of several inches thick on said surface.

References Cited in the file of this patent

UNITED STATES PATENTS

| | | |
|---|---|---|
| 1,369,467 | Plummer | Feb. 22, 1921 |
| 2,424,353 | Essig | July 22, 1947 |
| 2,463,791 | Morgan | Mar. 8, 1949 |

FOREIGN PATENTS

| | | |
|---|---|---|
| 461,483 | Canada | Nov. 29, 1949 |
| 129,323 | Great Britain | July 17, 1919 |

OTHER REFERENCES

"Heat-Transmitting Mirror," Society of Motion Picture and Tel. Engrs. Journal, vol. 58, January 1952, pp. 36 to 41 with Figs. 7 to 9 on pp. 40 and 41 of particular interest.